United States Patent
Komiya et al.

(10) Patent No.: US 8,567,171 B2
(45) Date of Patent: Oct. 29, 2013

(54) CABLE PROTECTION AND GUIDE APPARATUS

(75) Inventors: Shoichiro Komiya, Osaka (JP); Katsuhide Yamashita, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/536,532

(22) Filed: Jun. 28, 2012

(65) Prior Publication Data

US 2013/0008143 A1      Jan. 10, 2013

(30) Foreign Application Priority Data

Jul. 7, 2011   (JP) ................................. 2011-150852

(51) Int. Cl.
 *F16G 13/16*   (2006.01)
(52) U.S. Cl.
 USPC ................................ 59/78.1; 249/49; 249/51
(58) Field of Classification Search
 USPC ........................ 59/78.1; 249/49, 51
 See application file for complete search history.

(56) References Cited

U.S. PATENT DOCUMENTS

| 6,173,560 | B1 * | 1/2001 | Weber | 59/78.1 |
| 7,310,936 | B2 * | 12/2007 | Saiki et al. | 59/78.1 |
| 7,451,590 | B2 * | 11/2008 | Blase | 59/78.1 |
| 7,526,910 | B2 * | 5/2009 | Komiya | 59/78.1 |
| 2007/0017199 | A1 | 1/2007 | Saiki et al. | |

FOREIGN PATENT DOCUMENTS

JP   2007-010087   1/2007

* cited by examiner

*Primary Examiner* — David B Jones
(74) *Attorney, Agent, or Firm* — Woodling, Krost and Rust

(57) ABSTRACT

The invention provides a cable protection and guide apparatus allowing a protecting and guiding apparatus to be downsized by reducing a radius of a polygonal bend formed when link plates are bent back in a cable longitudinal direction between a cable stationary end and a cable mobile end and achieving smooth relative movements of shoes that face with each other between the upper and lower cable-bend inner circumferential sides by easing impact energy and impact sound of the shoes. The shoes provided on the cable-bend inner circumferential sides of the pair of link plates laterally and separately disposed have slidable-contact portions having parallelogram slidable-contact surfaces configured to face to and to mutually slidably contact with each other between upper and lower cable-bend inner circumferential sides.

5 Claims, 10 Drawing Sheets

CABLE PROTECTION AND GUIDE APPARATUS

CROSS REFERENCE TO RELATED APPLICATIONS

This application claims the benefit of Japanese Patent Application No. 2011-150852, filed on Jul. 7, 2011, which is hereby incorporated by reference herein in its entirety.

BACKGROUND OF THE INVENTION

1. Field of the Invention

The present invention relates to a cable protection and guide apparatus configured to be connected between a mobile section and a stationary section of industrial machines, vehicles and others to securely protect and guide flexible cables such as electrical cables for transmitting electrical signals or supplying power and hoses for supplying hydraulic pressure and air pressure.

2. Description of Related Art

The prior art cable protection and guide apparatus (also referred to appropriately as the 'protection and guide apparatus' or just as the 'apparatus' hereinafter) has a large number of link frames each comprising a pair of link plates laterally and separately disposed and connecting plates configured to crosslink the link plates respectively on inner and outer circumferential sides of the link plates when the apparatus is bent (referred to as the 'cable-bend inner or outer circumferential side', respectively, hereinafter). The apparatus is constructed by articulately linking the large number of link frames in a cable longitudinal direction so that the link frames can be sequentially bent while keeping a certain radius of the polygonal bend.

Then, as shown in FIGS. 11 through 13 which illustrate the prior art cable protection and guide apparatus 500, shoes 540 are attached on the cable-bend inner circumferential side of the link plates 510 to prevent the cable-bend inner circumferential side of the link plates 510 located below from directly contacting with the cable-bend inner circumferential side of the link plates 510 bent back and located above, thus causing noise and wear, when the protecting and guiding apparatus is used by bending back in the cable longitudinal direction in a long moving stroke as disclosed in Japanese Patent Application Laid-open No. 2007-10087 (Claims, FIG. 1) for example.

As shown in FIGS. 11 through 13, the apparatus 500 disclosed in Japanese Patent Application Laid-open No. 2007-10087 has the shoes 540 each having a rectangular slidable-contact portion 541, i.e., slidable-contact surface 541a, where the shoes 540 on the upper and lower cable-bend inner circumferential sides slidably contact with each other. Therefore, it is inevitable to assure a bend having a large radius R2 and polygonally formed by the slidable-contact portions 541 of the shoes 540 adjacent in the cable longitudinal direction that contact and interfere with each other in moving the shoes by bending back in the cable longitudinal direction between a cable stationary end and a cable mobile end. As a result, there is a problem that it is unable to downsize the protecting and guiding apparatus.

Although it is possible to reduce the radius R2 of the polygonal bend by reducing and downsizing the rectangular slidable-contact surface 541a in the cable longitudinal direction, the slidable-contact surfaces 541a of the shoes 540 facing with each other between the upper and lower cable-bend inner circumferential sides are caught and obstruct with each other. Therefore, there is a problem that it is unable to relatively move the protecting and guiding apparatus bent back in the cable longitudinal direction smoothly between the cable stationary and moving ends and that contact noise is generated.

Still further, because the shoes 540 are engaged only with and supported by the link plates 510, there is a problem that the shoes 540 may fall off the link plates 510 if the shoes 540 are repeatedly slid and moved over a long period of time.

Accordingly, there is a need for a cable protection and guide apparatus downsized by reducing a radius of a polygonal bend formed when link plates are bent back in the cable longitudinal direction between cable stationary and mobile ends and to achieve smooth relative movements of the shoes that face with each other between the upper and lower cable-bend inner circumferential sides by easing impact energy and impact sound of the shoes.

SUMMARY OF THE INVENTION

According to a first aspect of the invention, the present invention provides a cable protection and guide apparatus comprising a plurality of link frames each including a pair of link plates laterally and separately disposed from each other and connecting plates configured to crosslink the link plates respectively on cable-bend inner and outer circumferential sides of the link plates. The apparatus is constructed by linking the plurality of link frames in a cable longitudinal direction so that cables and the like inserted through the link frames are displaced by bending back the link plates in the cable longitudinal direction between a cable stationary end and a cable mobile end. The link frame further includes a shoe provided on the cable-bend inner circumferential side of each link plate and configured to have a slidable-contact portion. The shoe has also a slidable-contact surface formed into a parallelogram as part of the slidable-contact portion so that the slidable-contact surface faces to and slidably contacts with another slidable-contact surface between the upper and lower cable-bend inner circumferential sides, a mounting surface formed on the back of the slidable-contact surface of the slidable-contact portion, a plate nipping outer wall portion and a plate nipping inner wall portion configured to project toward the link plate from the mounting surface to removably nip the link plate in a plate width direction, and a shoe supporting projection configured to project toward the connecting plate on the cable-bend inner circumferential side from the mounting surface and to abut the connecting plate.

According to a second aspect of the invention, the shoe further includes tapered guide surfaces that are configured to face to and mutually ride each other between the upper and lower cable-bend inner circumferential sides at diagonal areas which are separated most in the parallelogram slidable-contact surface formed on the shoe.

According to a third aspect of the invention, the shoe further includes tapered end surfaces formed continuously from the slidable-contact surface to the mounting surface of the slidable-contact portion to reduce a radius of a polygonal bend formed when the link plates are bent back one after another in the cable longitudinal direction.

According to a fourth aspect of the invention, the shoe further includes contact avoiding surfaces formed by cutting diagonal areas which are separated most on the mounting surface and the tapered end surface of the shoe to avoid the shoes that are successive in the cable longitudinal direction from contacting with each other in bending back the link plates in the cable longitudinal direction.

According to a fifth aspect of the invention, the parallelogram slidable-contact surfaces are arrayed bilaterally-symmetrically with each other among the pair of right and left link plates.

The cable protection and guide apparatus of the invention comprises the plurality of link frames each including the pair of link plates laterally and separately disposed from each other and the connecting plates configured to crosslink the link plates respectively on the cable-bend inner and outer circumferential sides of the link plates. The apparatus is constructed by articulately linking the plurality of link frames in the cable longitudinal direction. Accordingly, the protecting and guiding apparatus can not only relatively move the cables and the like inserted through the link frames by bending back the link plates in the cable longitudinal direction between the cable stationary end and the cable mobile end, but also brings about the following effects peculiar to the invention.

According to the first aspect of the cable protection and guide apparatus of the invention, the shoe provided on the cable-bend inner circumferential side of each link plate and configured to have the slidable-contact portion formed into the parallelogram as the part of the slidable-contact portion so that the slidable-contact surface faces to and slidably contacts with another slidable-contact surface between the upper and lower cable-bend inner circumferential sides. Therefore, a mutual gap in the cable longitudinal direction of the adjacent shoes respectively on the upper and lower cable-bend inner circumferential sides is enlarged by obliquely shifting sides facing each other of the parallelogram of the adjacent slidable-contact surfaces in parallel and a degree of freedom of bending of the link plates increases.

Accordingly, the radius of the polygonal bend can be reduced and it is possible to downsize the protecting and guiding apparatus and to realize continuous relative movements of the slidable-contact surfaces of the shoes in sliding the slidable-contact surfaces that face to and slidably contact with each other between the upper and lower cable-bend inner circumferential sides.

Then, the shoe provided on the cable-bend inner circumferential side of the link plate has the mounting surface formed on the back of the slidable-contact surface of the slidable-contact portion, the plate nipping outer wall portion and the plate nipping inner wall portion configured to project toward the link plate from the mounting surface to removably nip the link plate in the plate width direction, and the shoe supporting projection configured to project toward the connecting plate on the cable-bend inner circumferential side from the mounting surface and to abut the connecting plate as described above. Therefore, even if an excessive load is applied to the shoe in sliding the shoes, the load is dispersed to the link plate and the connecting plate and it is possible to maintain the stable shoe mounting state for a long period of time.

According to the second aspect of the cable protection and guide apparatus of the invention, the shoe further includes the tapered guide surfaces that are configured to face to and mutually ride each other between the upper and lower cable-bend inner circumferential sides at the diagonal areas which are separated most in the parallelogram slidable-contact surface formed on the shoe.

Therefore, the slidable-contact surfaces of the shoes overlap gradually in contact after overlapping the tapered guide surfaces of the shoes that face each other in non-contact when the shoes face to and mutually ride with each other between the upper and lower cable-bend inner circumferential sides.

Accordingly, it is possible to ease and considerably suppress impact energy and impact noise of the shoes that face each other between the upper and lower cable-bend inner circumferential sides.

According to the third aspect of the cable protection and guide apparatus of the invention, the shoe further includes tapered end surfaces configured to reduce the radius of the polygonal bend formed when the link plates are bent back one after another in the cable longitudinal direction and formed continuously between the slidable-contact surface and the mounting surface of the slidable-contact portion.

Therefore, because the tapered end surfaces of the shoes reduce the radius of the polygonal bend of the shoes even if the shoe attached to the preceding link plate approaches the shoe attached to the succeeding link plate in bending back the link plates in the cable longitudinal direction.

Accordingly, it is possible to downsize the protecting and guiding apparatus and to reduces an installation space thereof.

According to the fourth aspect of the cable protection and guide apparatus of the invention, the shoe further includes the contact avoiding surfaces configured to avoid the shoes that are successive in the cable longitudinal direction from contacting with each other in bending back the link plates in the cable longitudinal direction and formed by cutting the diagonal areas which are separated most between the mounting surface and the tapered end surface of the shoe.

Therefore, even if the shoe attached to the preceding link plate approaches the shoe attached to succeeding link plate in bending back the link plates in the cable longitudinal direction, the contact avoiding surfaces of the shoe avoid the shoes from contacting each other.

Accordingly, it is possible to completely avoid bending troubles and contact damages of the shoes.

According to the fifth aspect of the cable protection and guide apparatus of the invention, the parallelogram slidable-contact surfaces are arrayed bilaterally-symmetrically with each other among the pair of right and left link plates.

Therefore, the slidable-contact portions on the upper and lower cable-bend inner circumferential sides that are to face each other slidably contact evenly on the right and left sides without skewing with respect to the cable longitudinal direction among the pair of link plates.

Accordingly, the shoes on the upper and lower cable-bend inner circumferential sides move relatively stably while slidably contacting with each other when they face and slide each other by riding with each other.

Further features of the present invention will become apparent from the following description of exemplary embodiments with reference to the attached drawings.

DESCRIPTION OF THE EMBODIMENT

An embodiment of a cable protection and guide apparatus of the invention will be explained with reference to FIGS. 1 through 10.

Figure 1:
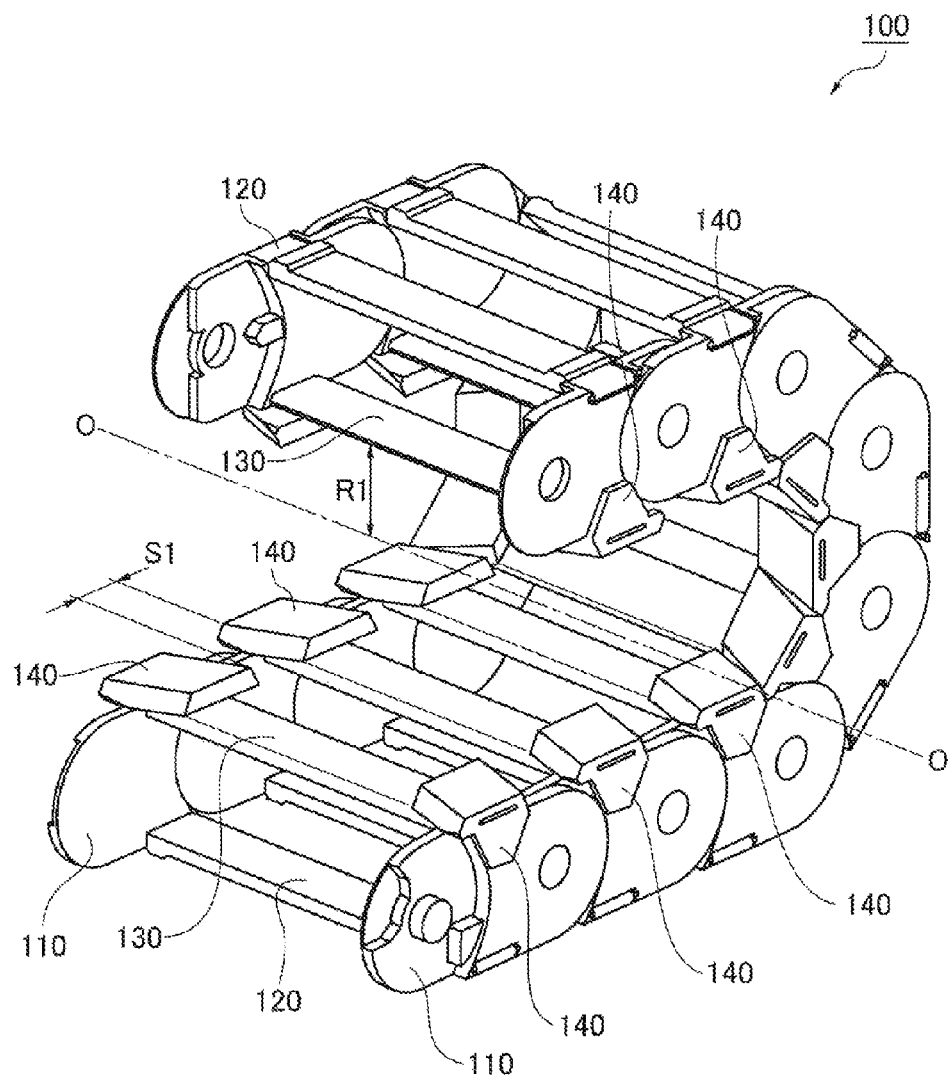
FIG. 1 is a schematic perspective view illustrating a bending state of a cable protection and guide apparatus of a first embodiment of the invention.
Figure 2:
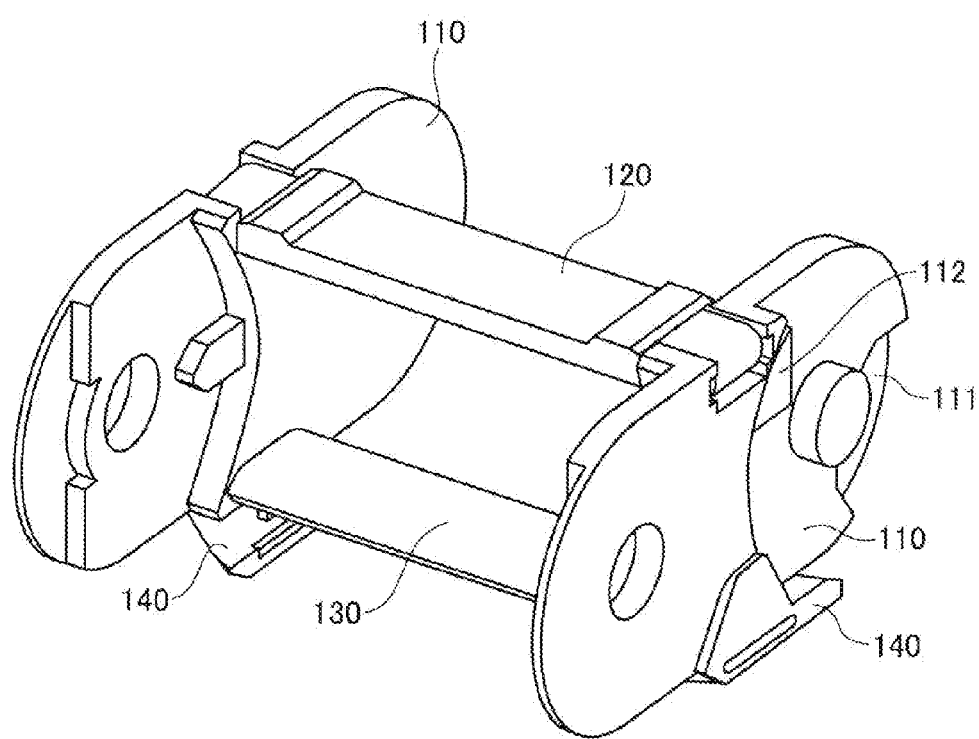
FIG. 2 is an enlarged perspective view of a link frame and a shoe shown in FIG. 1.
Figure 3:
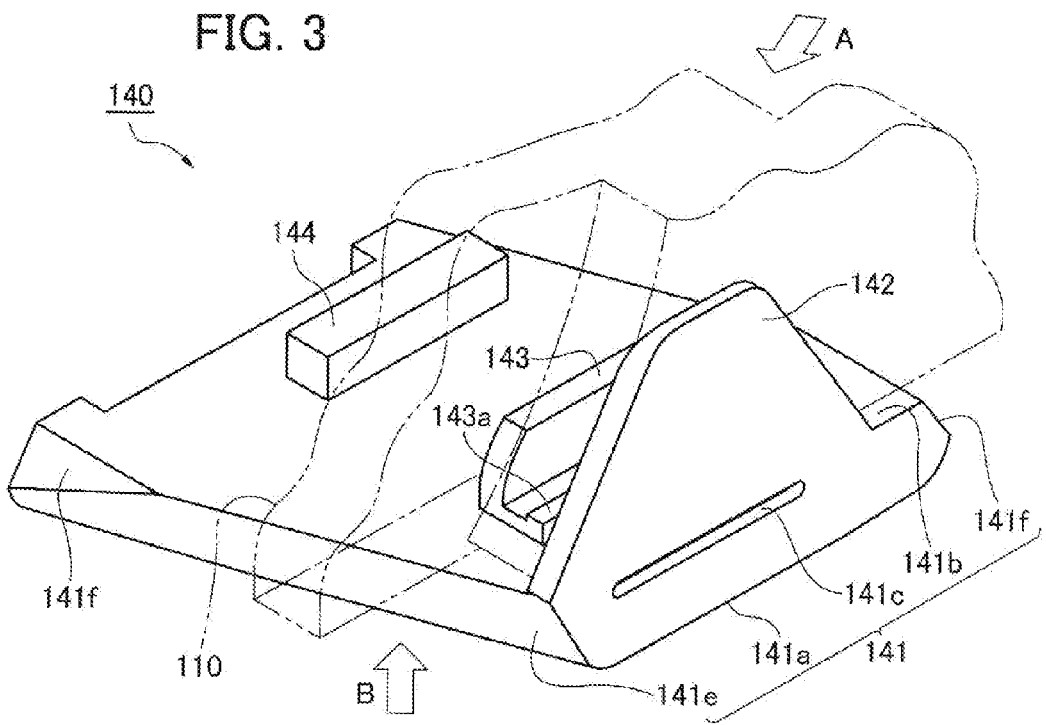
FIG. 3 is a perspective view of one of shoes shown in FIG. 2.
Figure 4:
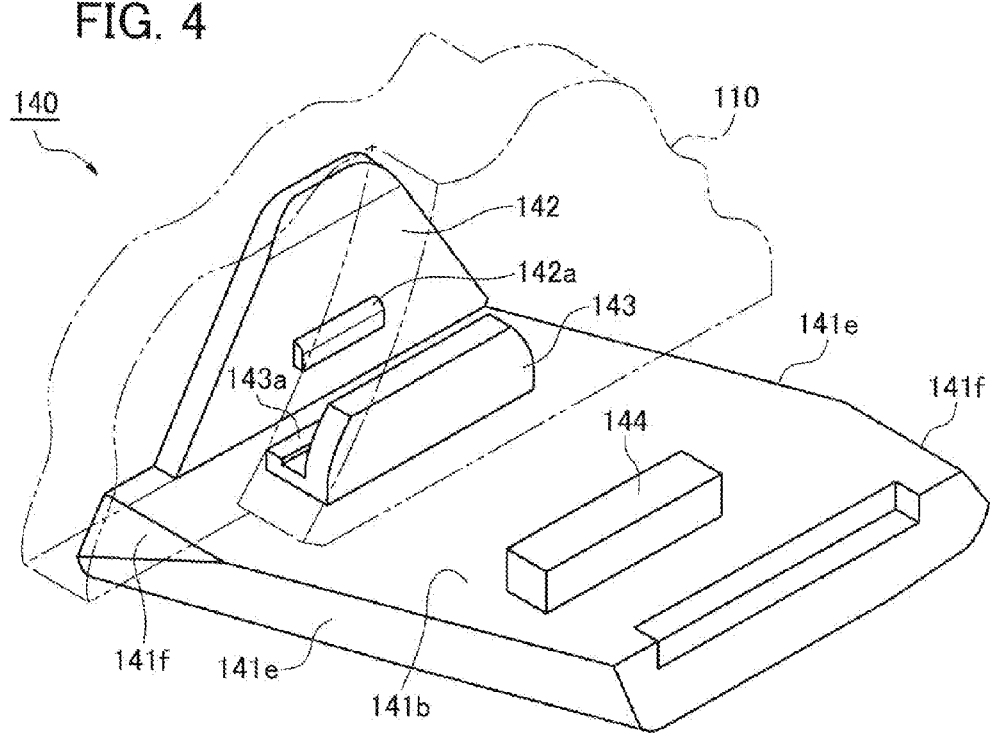
FIG. 4 is a perspective view of the shoe seen in a direction of A in FIG. 3.
Figure 5:
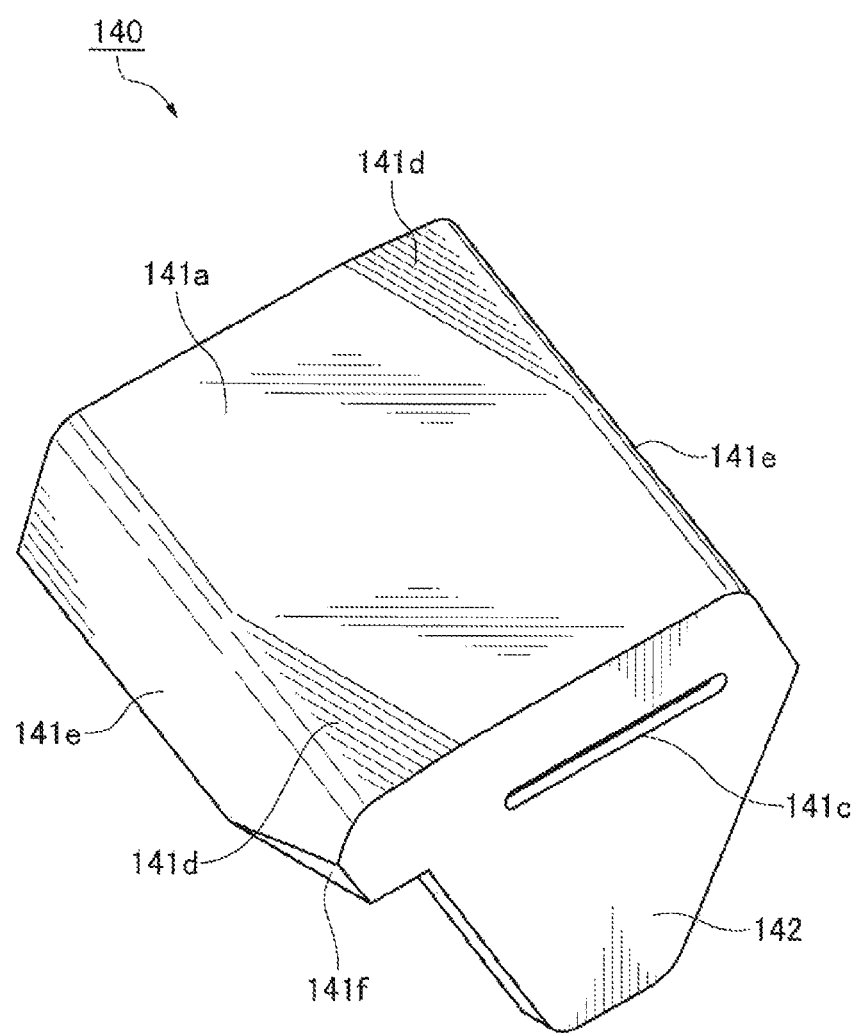
FIG. 5 is a perspective view of the shoe seen in a direction of B in FIG. 3.
Figure 6:
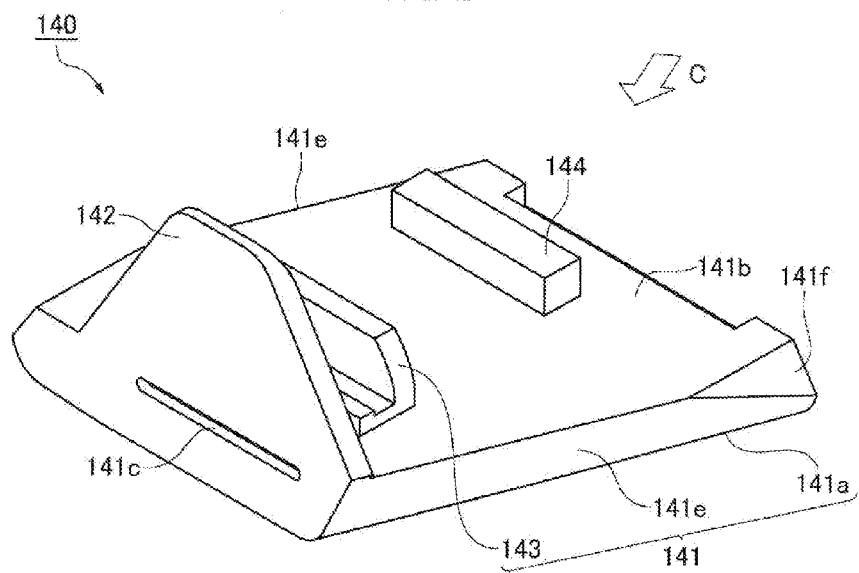
FIG. 6 is a perspective vive of another shoe show in FIG. 2.
Figure 7:
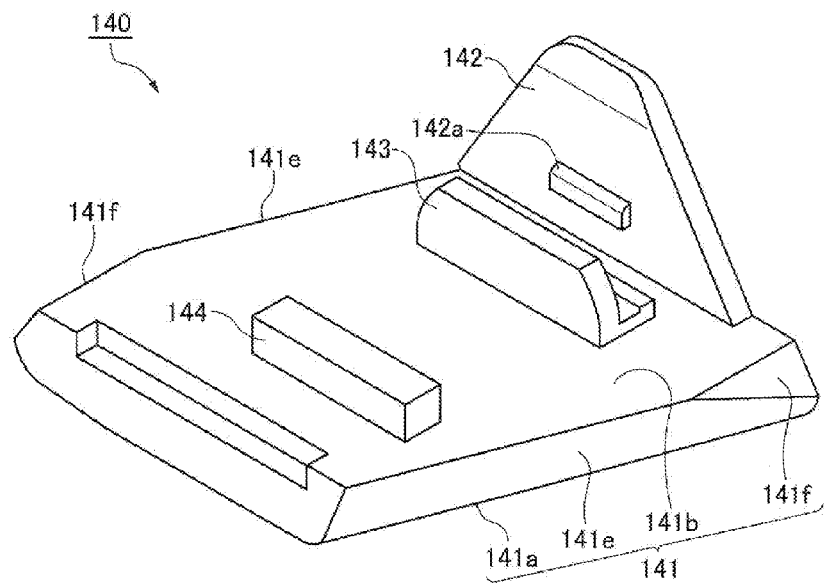
FIG. 7 is a perspective view seen in a direction of C in FIG. 6.
Figure 8A:
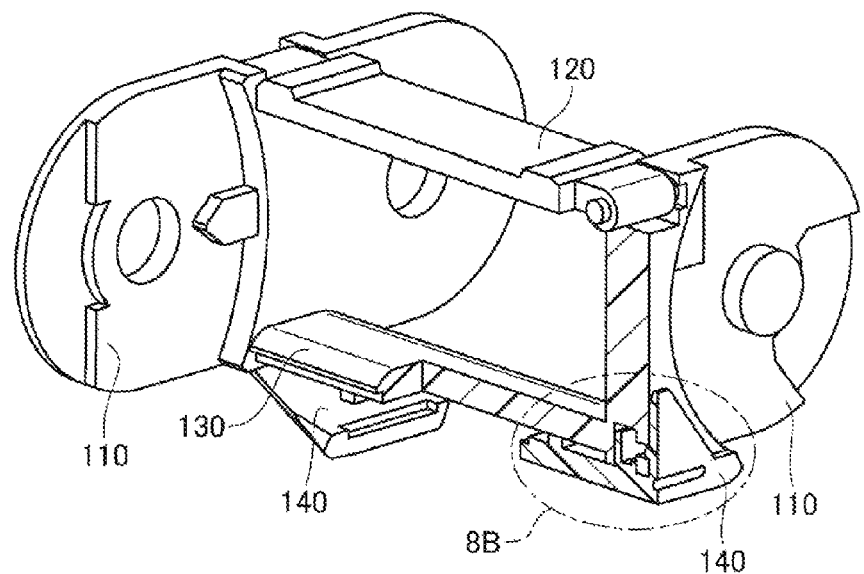
FIG. 8A is a partly sectioned perspective view illustrating an assembly state of the link frame and the shoe shown in FIG. 1.
Figure 8B:
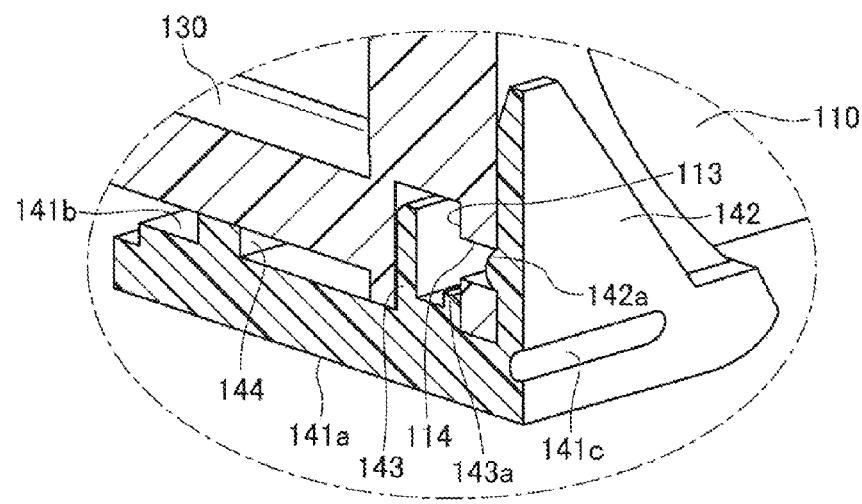
FIG. 8B is an enlarged view illustrating a part in FIG. 8A.
Figure 9:
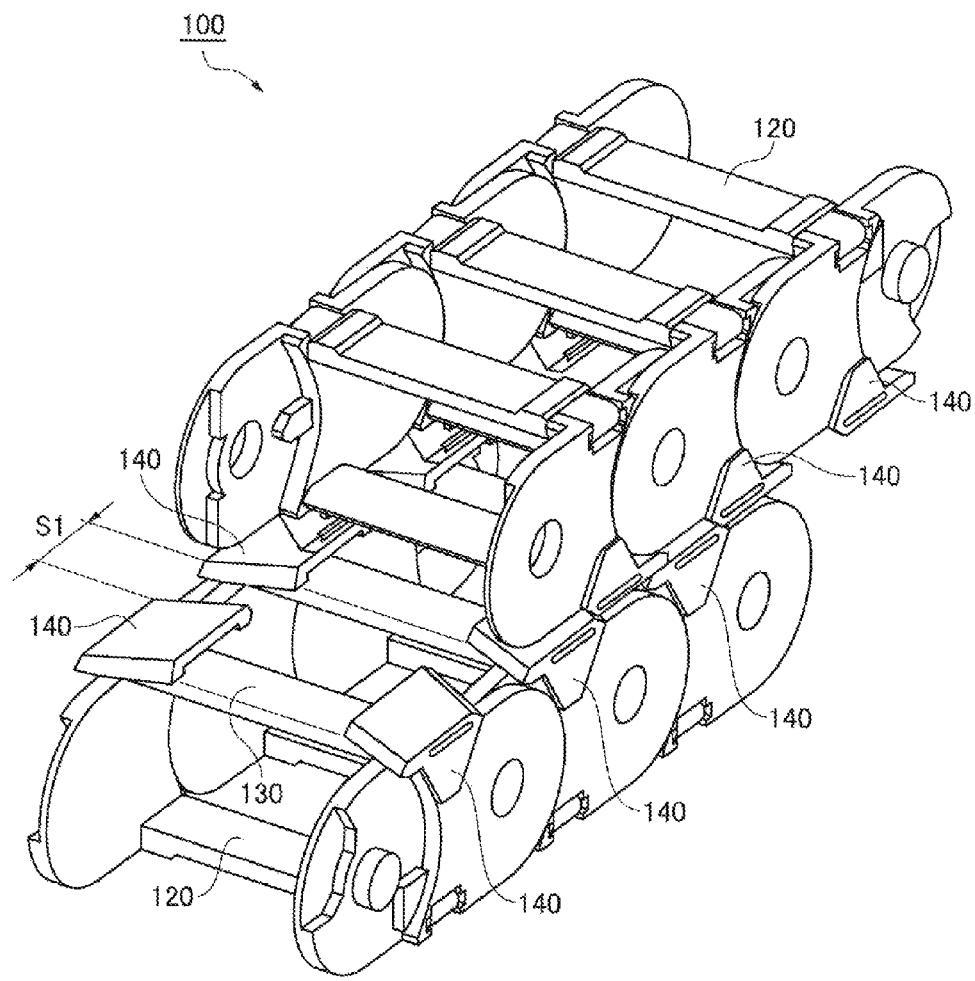
FIG. 9 is a perspective view illustrating a state in which upper and lower shoes slidably-contact in the apparatus of the embodiment.
Figure 10A:
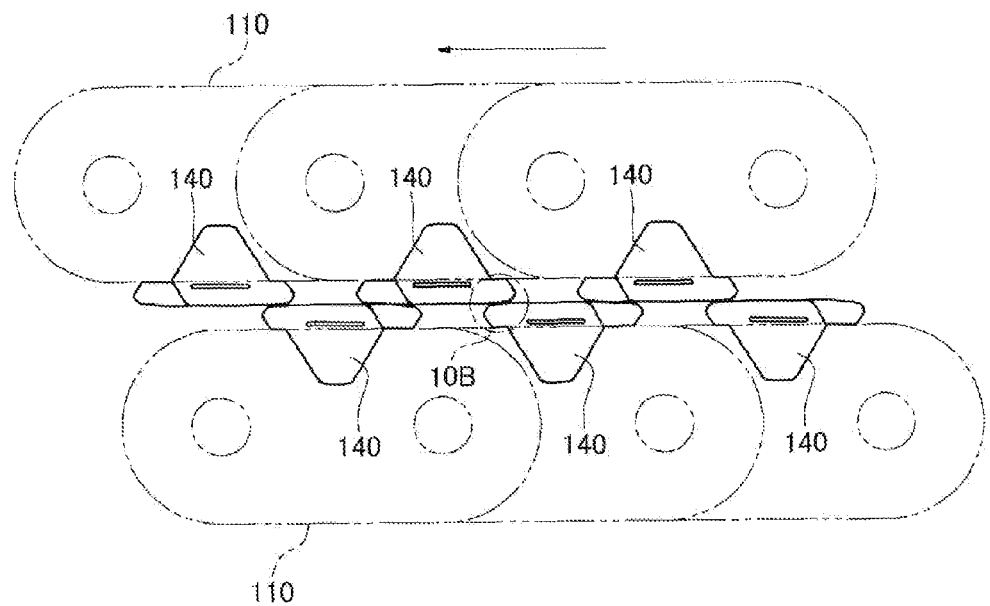
FIG. 10A is a side view illustrating the state in which the upper and lower shoes slidably-contact in the apparatus of the embodiment.
Figure 10B:
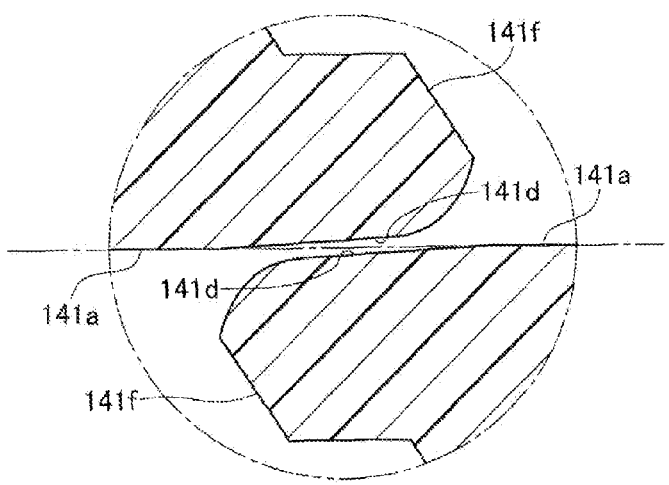
FIG. 10B is an enlarged view of the slidable-contact state shown in FIG. 10A.

Here, FIG. 1 is a schematic perspective view illustrating a bending state of a apparatus of a first embodiment, FIG. 2 is an enlarged perspective view of a link frame and a shoe shown in FIG. 1, FIG. 3 is a perspective view of one of shoes shown in FIG. 2, FIG. 4 is a perspective view of the shoe seen in a direction of A in FIG. 3, FIG. 5 is a perspective view of the shoe seen in a direction of B in FIG. 3, FIG. 6 is a perspective vive of another shoe show in FIG. 2, FIG. 7 is a perspective view seen in a direction of C in FIG. 6, FIG. 8A is a partly sectioned perspective view illustrating an assembly state of the link frame and the shoe shown in FIG. 1, FIG. 8B is an enlarged view illustrating a part in FIG. 8A, FIG. 9 is a perspective view illustrating a state in which upper and lower shoes slidably-contact in the apparatus of the embodiment, FIG. 10A is a side view illustrating the state in which the upper and lower shoes slidably-contact in the apparatus of the embodiment, and FIG. 10B is an enlarged view of the slidable-contact state shown in FIG. 10A.

As shown in FIG. 1, the cable protection and guide apparatus 100 of the embodiment has a large number of link frames each comprising a pair of link plates 110 laterally and separately disposed and connecting plates 120 and 130 respectively crosslinking these link plates on cable-bend inner and outer circumferential sides of the link plates. The apparatus is constructed by articulately linking the large number of link frames in the cable longitudinal direction so that cables and the like (not shown) inserted through the link frames are moved relatively by bending back the link plates 110 in the cable longitudinal direction between the cable stationary end and the cable mobile end not shown.

Here, as shown in FIG. 2, a cutaway portion 111 and a projection 112 provided on the side surface of the link plate 110 described above are engaged respectively with engaged portions not shown of an adjacent link plate of another link frame. Thereby, the apparatus is constructed by articulately linking the link plates 110 in the cable longitudinal direction so that the link plates 110 can be bent back from each other in the cable longitudinal direction while restricting a radius of the polygonal bend to be constant.

While a material composing the link frame having the link plates 110 and the connecting plates 120 and 130 described above is not specifically limited, it is preferable to form them by using glass fiber reinforced polyamide resin which exhibits excellent strength.

Next, a shoe 140 made of synthetic resin and provided on the cable-bend inner circumferential side of the link plate 110, which is the most characteristic part of the cable protection and guide apparatus 100 of the present embodiment, will be explained in detail with reference to FIGS. 3 through 10.

That is, the shoe 140 shown in FIGS. 3 through 7 has a slidable-contact portion 141, a parallelogram shaped slidable-contact surface 141a which is configured as part of the slidable-contact portion 141 to face to and to slidably contact another slidable-contact surface between the upper and lower cable-bend inner circumferential sides, a mounting surface 141b formed on the back of the slidable-contact surface 141a of the slidable-contact portion 141, a plate nipping outer wall portion 142 and a plate nipping inner wall portion 143 projecting toward the link plate 110 from the mounting surface 141b to removably nip the link plate 110 in a plate width direction, and a shoe supporting projection 144 projecting from the mounting surface 141b to the connecting plate 130 on the cable-bend inner circumferential side to abut the connecting plate 130.

It is noted that imaginary lines indicated by two-dot chain lines in FIGS. 3 and 4 show a part of the link plate 110 to which the shoe 140 described above is attached.

With this arrangement, each mutual gap S1 in the cable longitudinal direction of the adjacent shoes 140 respectively on the upper and lower cable-bend inner circumferential sides as shown in FIG. 1 is widened by shifting opposing sides of the parallelograms of the adjacent slidable-contact surfaces 141a, i.e., the parallelograms composed of the slidable-contact surfaces 141a and the tapered guide surfaces 141d, obliquely in parallel, so that a degree of freedom of bending of the link plates 110 increases. Accordingly, the radius R1 of the bend centering on an imaginary center axis O-O is smaller than the radius R2 of the prior art bend in bending back the link plates in the cable longitudinal direction between the cable stationary and mobile ends.

As shown in FIGS. 8A and 8B, the shoe 140 is attached to and supported by the link plate 110 by nipping the link plate 110 between the plate nipping outer wall portion 142 and the plate nipping inner wall portion 143 and by abutting a shoe supporting projection 144 projecting from the mounting surface 141b to the connecting plate 130 on the cable-bend inner circumferential side.

Then, as shown in FIGS. 3 through 7, the pair of right and left shoes 140 arrayed between the pair of right and left link plates 110 shown in FIG. 1 has the parallelogram slidable-contact portions 141, respectively, formed so that the slidable-contact portions are bilaterally symmetrical with each other.

With this arrangement, the slidable-contact portions 141 on the upper and lower cable-bend inner circumferential sides that are to face each other slidably contact evenly on the right and left sides without skewing with respect to the cable longitudinal direction among the pair of link plates 110. Thereby, the shoes 140 on the upper and lower cable-bend inner circumferential sides move relatively stably while slidably contacting with each other when they face and slide each other by riding with each other.

It is noted that as shown in FIGS. 3 through 6, the Link plate 110 has also a laterally long hook 142a provided on an inner side surface of the plate nipping outer wall portion 142 described above, a laterally long plate engaging projection 143a provided integrally with and close to the plate nipping inner wall portion 143 described above, and an indicator 141c provided on a side surface of the slidable-contact portion 141 described above to check a wear of the shoe 140. As shown in FIG. 8, the link plate 110 also has an insertion hole 113 into which the plate nipping inner wall portion 143 and the plate nipping inner wall portion 143*a* of the shoe 140 are inserted and a recess 114 that engages with the hook 142*a* described above.

Then, as shown in FIG. 5, the shoe 140 has also tapered guide surfaces 141*d* that are configured to face to and mutually ride the guide surfaces on the upper and lower cable-bend inner circumferential sides. The tapered guide surfaces 141*d* are provided respectively so that the parallelogram slidable-contact surface 141*a* formed on the shoe 140 is tapered and thinned gradually toward diagonal areas which are separated most in the slidable-contact surface 141*a*.

With this arrangement, as shown in FIGS. 9 and 10, the slidable-contact surfaces 141*a* of the shoes 140 overlap gradually in contact after overlapping the tapered guide surfaces 141*d* of the shoes 140 that face each other in non-contact when the shoes 140 on the upper and lower cable-bend inner circumferential sides face and mutually ride each other.

Still further, tapered end surfaces 141*e* are formed continuously between the slidable-contact surface 141*a* and the mounting surface 14.1*b* of the slidable-contact portion 141 as shown in FIG. 5 and others. The slidable-contact surface 141*a* reduces the radius R1 of the polygonal bend formed when the link plates 110 are bent back one after another in the cable longitudinal direction.

With this arrangement, the tapered end surfaces 141*e* of the shoes 141 reduce the radius R1 of the bend of the shoes 140 as shown in FIG. 1 even if the shoe 140 attached to the preceding link plate 110 approaches the shoe 140 attached to the succeeding link plate 110 in bending back the link plates 110 in the cable longitudinal direction. Accordingly, it is possible to downsize the protecting and guiding apparatus and to reduces an installation space thereof.

It is noted that a chamfering angle of the tapered end surfaces 141*e* provided in the front and rear parts of the shoe 140 described above may be an angle that reduces a width of the shoe 140 in the cable longitudinal direction from the mounting surface 141*b* to the slidable-contact surface 141*a* to reduce the radius R1 of the polygonal bend.

Still further, as shown in FIGS. 3 through 7, contact avoiding surfaces 141*f*, that avoid the shoes 140 that are successive in the cable longitudinal direction from contacting with each other in bending back the link plates 110 in the cable longitudinal direction, are formed by partially cutting just triangular pyramid portions of diagonal areas which are separated most between the mounting surface 140*b* and the tapered end surface 141*e* of the shoe 140.

With this arrangement, because the contact avoiding surfaces 141*f* are formed by cutting the corners of the shoes 140, it is possible to avoid the shoes 140 that are successive in the cable longitudinal direction from contacting with each other by the contact avoiding surface 141*f* formed by cutting the corners of the shoes 140 even if the shoe 140 attached to the preceding link plate 110 approaches the shoe 140 attached to succeeding link plate 110 in bending back the link plates 110 in the cable longitudinal direction.

Figure 11:
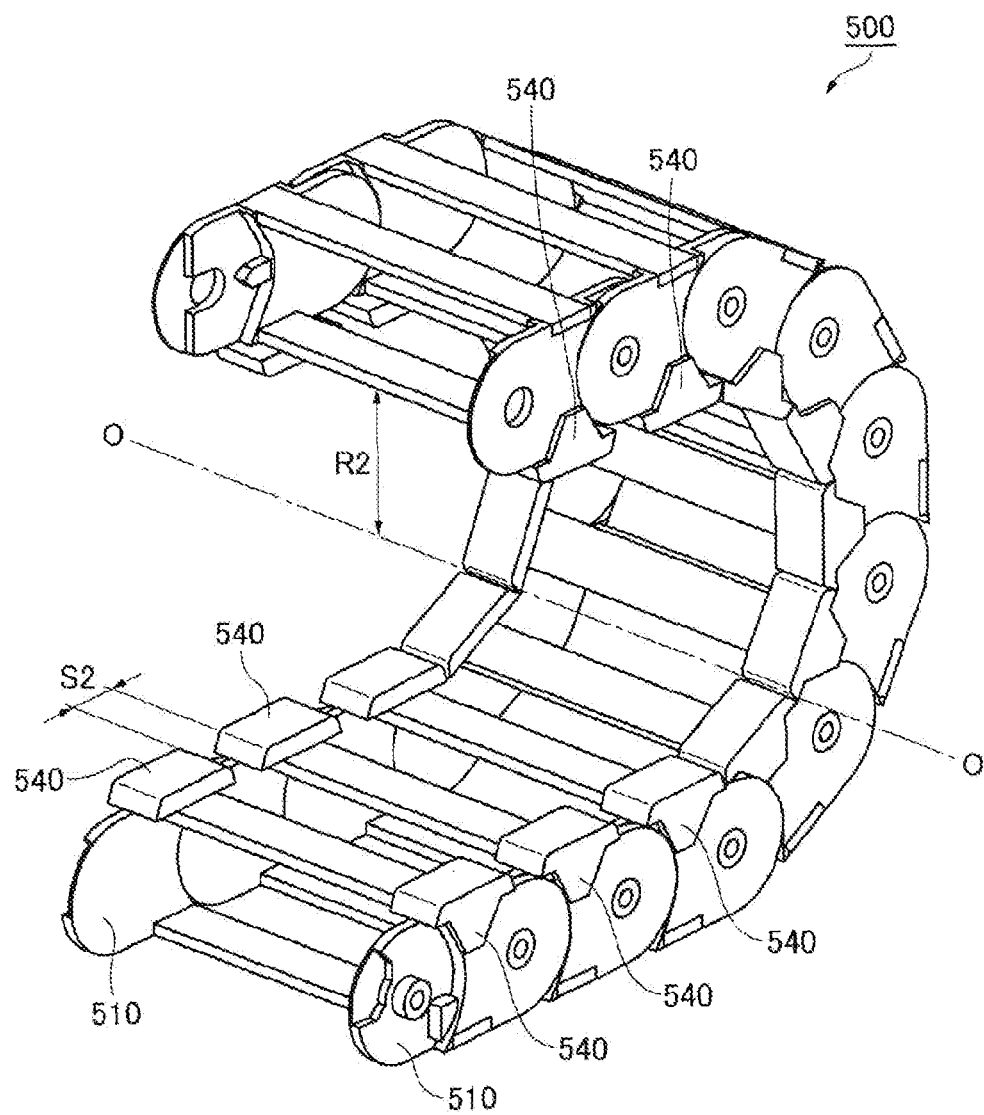
FIG. 11 is a schematic perspective view illustrating a bending state of a prior art cable protection and guide apparatus.
Figure 12:
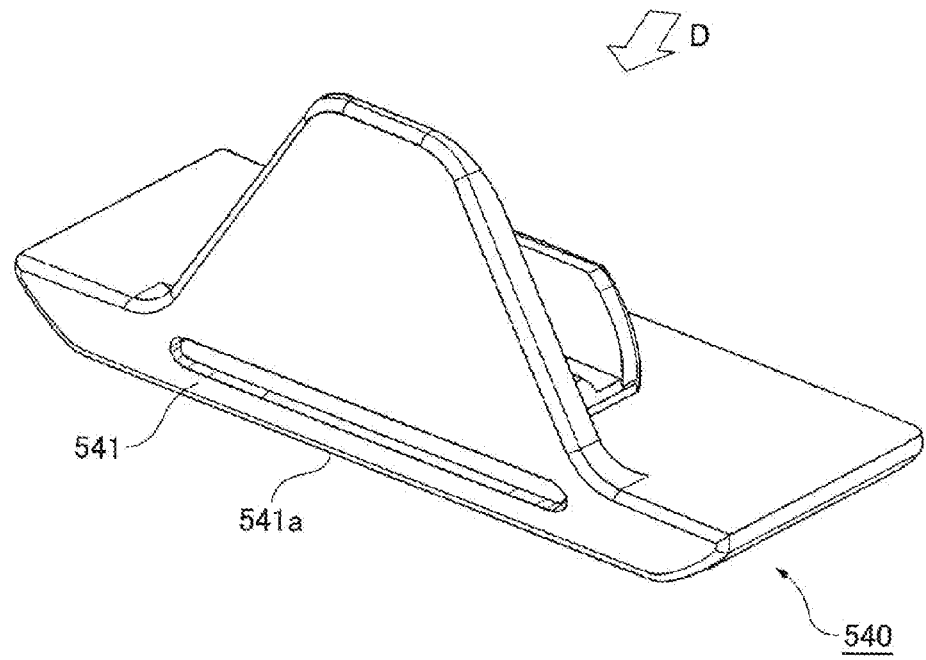
FIG. 12 is a perspective view of a shoe used in the prior art apparatus.
Figure 13:
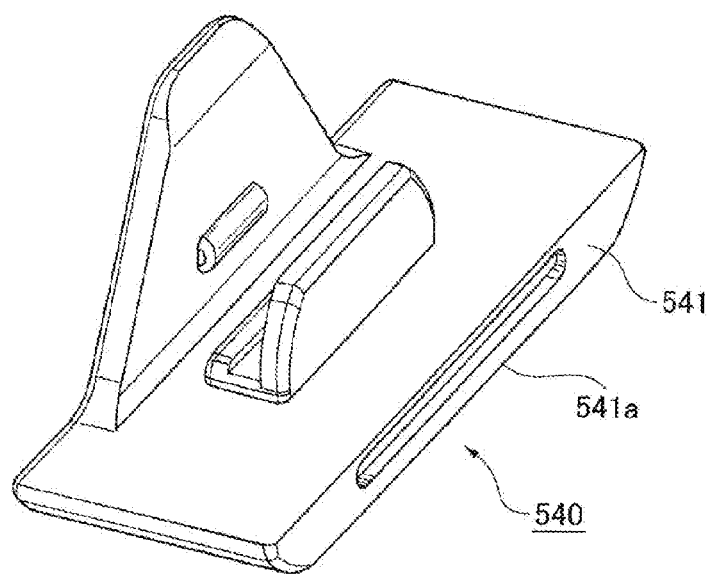
FIG. 13 is a perspective view of the shoe seen from a direction of D in FIG. 12.

In the apparatus 100 of the present embodiment thus obtained, the shoes 140 attached to the link plates 110 on the upper and lower cable-bend inner circumferential sides have the slidable-contact portions 141 having the parallelogram slidable-contact surfaces 141*a* that face to and mutually contact with each other as described above. Therefore, as compared to the mutual gap S2 of the prior art shoes 541 having the rectangular slidable-contact surfaces 541*a* as shown in FIG. 11, the mutual gap S1 of the shoes 141 of the invention having the parallelogram slidable-contact surfaces 141*a* successive in the cable longitudinal direction as shown in FIG. 1 is widened by obliquely shifting the opposing sides of the parallelograms composing the slidable-contact surfaces 141*a* in bending back the link plates 110 sequentially in the cable longitudinal direction between the cable stationary end and the cable mobile end. Therefore, the degree of freedom of the bend increases and the radius R1 of the bend centering on the imaginary center axis O-O is smaller than the radius R2 of the prior art bend. Thus, it is possible to downsize the protecting and guiding apparatus and to realize continuous relative movement of the slidable-contact surfaces 141*a* in sliding the slidable-contact surfaces 141*a* of the shoes 140 that face and mutually slidably contact with each other on the upper and lower cable-bend inner circumferential sides.

Then, the shoe 140 attached to the link plate 110 has the mounting surface 141*b* formed on the back of the slidable-contact surface 141*a* of the slidable-contact portion 141, the plate nipping outer wall portion 142 and the plate nipping inner wall portion 143 projecting toward the link plate 110 from the mounting surface 141*b* to removably nip the link plate 110 in the plate width direction, and the shoe supporting projection 144 projecting toward the connecting plate 130 on the cable-bend inner circumferential side from the mounting surface 141*b* to abut the connecting plate 130 as described above. Therefore, even if an excessive load is applied to the shoe 140 in sliding the slidable-contact surfaces 141*a* of the shoes 140 that face to and slidably contact with each other between the upper and lower cable-bend inner circumferential sides, the load is dispersed to the link plate 110 and the connecting plate 130, so that it is possible to maintain a stable shoe-attached state for a long period of time.

Then, the tapered guide surfaces 141*d* that face to and mutually ride with each other between the upper and lower cable-bend inner circumferential sides are provided at the diagonal areas which are separated most in the parallelogram slidable-contact surface 141*a* formed on the shoe 140 as described above. Therefore, it is possible to ease and considerably suppress impact energy and impact sound of the shoes 140 otherwise caused when the shoes 140 faces to and mutually ride with each other on the upper and lower cable-bend inner circumferential sides.

Still further, the contact avoiding surfaces 141*f*, that avoid the shoes 140 that are successive in the cable longitudinal direction from contacting with each other are formed by cutting the diagonal areas which are separated most between the mounting surface 141*b* and the tapered end surface 141*e* of the shoe 140 as described above. Therefore, it is possible to completely avoid bending troubles and contact damages of the shoes 140 in bending back the link plates 110 in the cable longitudinal direction. Thus, the effects of the invention are remarkable.

The specific mode of the cable protection and guide apparatus of the present invention may take any mode as long as the apparatus has the following features. That is, the apparatus comprises the plurality of link frames each including the pair of link plates laterally and separately disposed from each other and the connecting plates configured to crosslink the link plates respectively on the cable-bend inner and outer circumferential sides of the link plates. The apparatus is constructed by articulately linking the plurality of link frames in the cable longitudinal direction so that the cables and the like inserted through the link frames are displaced by bending back the link plates in the cable longitudinal direction between the cable stationary end and the cable mobile end.

The link frame further includes the shoe provided on the cable-bend inner circumferential side of each link plate and configured to have the slidable-contact portion. The shoe has also the slidable-contact surface formed into the parallelogram as the part of the slidable-contact portion so that the slidable-contact surface faces to and slidably contacts with another slidable-contact surface between the upper and lower cable-bend inner circumferential sides, the mounting surface formed on the back of the slidable-contact surface of the slidable-contact portion, the plate nipping outer wall portion and the plate nipping inner wall portion configured to project toward the link plate from the mounting surface to removably nip the link plate in the plate width direction, and the shoe supporting projection configured to project toward the connecting plate on the cable-bend inner circumferential side from the mounting surface and to abut the connecting plate.

Then, the degree of freedom of the bend between the link plates increases in sequentially bending back the link plates in the cable longitudinal direction between the cable stationary end and the cable mobile end and the radius of the bend in bending back the link plates is reduced. Thus, it is possible to ease the impact energy and impact noise of the shoes facing on the upper and lower cable-bend inner circumferential sides and to realize the smooth relative movements of the shoes.

For instance, the specific material of the link plates used in the apparatus of the invention may be either one of synthetic resin such as engineering resin and metal such as aluminum. Still further, the specific shape of the link plates may be any shape as long as the link plates compose part of the link frame and the link plates can be connected in the cable longitudinal direction so that the link plates can relatively move the cable and the like inserted through the link frames constructed by connecting the link plates by bending back in the cable longitudinal direction between the cable stationary end and the cable mobile end.

Still further, the specific material of the shoes used in the protecting and guiding apparatus of the invention may be any synthetic resin such as the engineering plastic that exhibits excellent self-lubricating property. The specific shape of the shoes may be any shape as long as the slidable-contact portions thereof have parallelogram slidable-contact surfaces that slidably contact with each other between the upper and lower cable-bend inner circumferential sides.

What is claimed is:

1. A cable protection and guide apparatus, comprising:
    a plurality of link frames;
    each of said link frames includes a pair of link plates laterally and separately disposed from each other, each of said pair of link plates includes left and right link plates;
    each of said left and right link plates are articulately connected to each other in a longitudinal direction enabling said link plates to form a flexional circumferential bend having a flexional inner circumferential side and flexional outer circumferential side during bending;
    each of said link plates includes a flexional inner circumferential side residing during bending on said flexional inner circumferential side of said bend;
    each of said link plates includes a flexional outer circumferential side residing during bending on said outer flexional circumferential side of said bend;
    each link frame includes first and second connecting plates, said first and second connecting plates crosslink said left and right link plates respectively on said flexional inner and outer circumferential sides, respectively;
    said cable is inserted through said link frames in said longitudinal direction;
    each of said right and left link plates of said frame includes a shoe on said flexional inner circumferential side thereof;
    each of said shoes includes a slidable contact side and a back side;
    each of said slidable contact sides of each of said shoes includes a slidable contact portion;
    each of said slidable contact portions of each of said slidable contact sides of each of said shoes includes a slidable contact surface, each of said slidable contact surfaces being in the shape of a parallelogram;
    a first portion of said slidable contact surfaces of said slidable contact portions of said slidable contact sides of said shoes residing on said flexional inner circumferential sides of said left and right link plates face toward and engage a second portion of said slidable contact surfaces of said slidable contact portions of said slidable contact sides of said shoes residing on said flexional inner circumferential sides; and,
    each of said shoes includes: a mounting surface, said mounting surface resides on said back side of said shoes; a link plate nipping outer wall portion and a link plate nipping inner wall portion extending from said mounting surface to said flexional inner circumferential side of said link plate removably gripping said link plate in a plate width direction; and, a shoe supporting projection extending from said mounting surface to said first connecting plate cross-linking said left and right link plates of said link frame on said flexional inner circumferential side.

2. The cable protection and guide apparatus according to claim 1, wherein:
    each slidable contact surface of each of said slidable contact portions of each of said slidable contact sides of each of said shoes includes first and second tapered guide surfaces.

3. The cable protection and guide apparatus according to claim 1, wherein:
    said flexional circumferential bend having a flexional inner circumferential side and flexional outer circumferential side during bending includes a radius; and,
    each of said slidable contact surfaces of each of said slidable contact portions of each of said slidable contact sides of each of said shoes includes first and second tapered end surfaces extending from said slidable contact surfaces to said mounting surface to reduce said radius of said flexional circumferential bend.

4. The cable protection and guide apparatus according to claim 3, wherein:
    each of said shoes includes contact avoiding surfaces to prevent said shoes from contacting each other during bending.

5. The cable protection and guide apparatus according to claim 1, wherein:
    each of said parallelogram shaped slidable contact surfaces of each of said slidable contact portions of said slidable contact sides of each of said shoes affixed to each of said pair of right and left link plates are arrayed bilaterally-symmetrically with each other.

* * * * *

UNITED STATES PATENT AND TRADEMARK OFFICE
CERTIFICATE OF CORRECTION

Page 1 of 1

PATENT NO. : 8,567,171 B2
APPLICATION NO. : 13/536532
DATED : October 29, 2013
INVENTOR(S) : Shoichiro Komiya and Katsuhide Yamashita It is certified that error appears in the above-identified patent and that said Letters Patent is hereby corrected as shown below:

In the Specification

Col. 5, line 33, delete "vive" and insert --view-- therefor.

Col. 6, line 62, delete "Link" and insert --link-- therefor.

Signed and Sealed this
First Day of April, 2014

Michelle K. Lee
*Deputy Director of the United States Patent and Trademark Office*